United States Patent
Kamimura

(10) Patent No.: US 6,266,077 B1
(45) Date of Patent: Jul. 24, 2001

(54) METHOD OF COMPENSATING FOR OUTPUT VARIATIONS IN A PRINTING HEAD

(75) Inventor: Katsuya Kamimura, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 08/996,698

(22) Filed: Dec. 23, 1997

(30) Foreign Application Priority Data

Dec. 24, 1996 (JP) .................................................. 8-344064

(51) Int. Cl.[7] ...................................................... B41J 2/435
(52) U.S. Cl. ........................... 347/236; 347/237; 347/130
(58) Field of Search .................................. 347/236, 237, 347/246, 130, 132

(56) References Cited

U.S. PATENT DOCUMENTS

| | | | |
|---|---|---|---|
| 4,809,021 | * 2/1989 | Check et al. | 347/251 |
| 4,941,004 | 7/1990 | Pham et al. | 347/132 |
| 5,200,765 | 4/1993 | Tai | 347/240 |
| 5,586,055 | * 12/1996 | Ng et al. | 347/236 |
| 5,668,587 | * 9/1997 | Hammond et al. | 347/130 |
| 5,774,165 | * 6/1998 | Nakajima et al. | 347/236 |
| 6,100,913 | * 8/2000 | Aikoh et al. | 347/237 |

FOREIGN PATENT DOCUMENTS 0 629 974A1   12/1994   (EP) .

* cited by examiner

*Primary Examiner*—N. Le
*Assistant Examiner*—Lamson D. Nguyen
(74) *Attorney, Agent, or Firm*—Rabin & Champagne, P.

(57) ABSTRACT

Compensation data for use in driving an array of printing elements in a printing head are obtained by measuring the uncompensated output value of each printing element, calculating a target value for each printing element, and determining a compensation value from the difference between the measured output value and the target value. The target values vary continuously across the array. The compensation data are stored in a non-volatile memory in the printing head. During printing, each printing element is driven with an energy corresponding to the compensation data, so that the output profile of the array follows the profile of target values.

36 Claims, 7 Drawing Sheets

US 6,266,077 B1

METHOD OF COMPENSATING FOR OUTPUT VARIATIONS IN A PRINTING HEAD

BACKGROUND OF THE INVENTION

The present invention relates to a method of compensating for uneven output in a printing head employing an array of printing elements, and to a printing head in which this method is employed.

One type of printing head having an array of printing elements is the LED printing head used in some electrophotographic printers. The printing elements are light-emitting diodes (LEDs) that illuminate a photosensitive drum to create an electrostatic latent image, which is developed by application of toner particles, transferred to a printing medium, and fused onto the printing medium. An LED printing head has the advantage of providing high throughput, because the drum can be illuminated by all light-emitting diodes (LEDs) in the array simultaneously, forming an entire line of latent image dots at once.

An attendant disadvantage, however, is that the optical output of the array is, in general, not uniform. Without compensation, different LEDs would produce different amounts of light, leading to printing irregularities. The usual solution to this problem is to measure the optical output of each LED when the array is manufactured, and compensate for the differences by varying the driving energy supplied to each LED during printing operations.

One conventional LED printing head, for example, has a control unit storing four bits of compensation data for each LED. When driven, each LED receives an amount of driving energy determined by the compensation data. This arrangement enables the optical output of each LED to be adjusted in sixteen steps.

A problem is that some LEDs may require more compensation than four bits of compensation data can provide. This problem could be solved by adding more bits of compensation data, but that would require expensive alterations to the LED driving electronics in the printing head. In practice, an LED array having an LED that is outside the four-bit compensation range is discarded. This practice lowers the yield of the LED array manufacturing process, consequently increasing the LED array cost and the cost of the printer.

A more detailed description of this problem will be given below. Similar problems can occur in thermal printing heads and ink-jet printing heads, in which the printing elements are heating elements or piezoelectric elements.

SUMMARY OF THE INVENTION

An object of the present invention is to compensate for nonuniform output in a printing head having an array of printing elements, using a limited number of bits of compensation data, without impairing manufacturing yields.

A further object is to improve the appearance of pages printed with a printing head having an array of printing elements.

The invented compensation method comprises the steps of:

measuring the output of each printing element in the array;

from the results, calculating a target value for each printing element, the target values varying gradually across the array;

determining compensation data for each printing element according to the difference between the output of the printing element and the target value of the printing element;

storing the compensation data in the printing head; and driving each printing element with an energy corresponding to the compensation data.

Each target value can be calculated by, for example, linear interpolation or moving averages.

The invented printing head has an array of printing elements and a non-volatile memory storing compensation data used in driving the printing elements. The compensation data cause the outputs of the printing elements to vary across the array, output variations between adjacent printing elements not exceeding a certain limit, but this limit does not apply to variations between printing elements that are not adjacent.

Given a limited number of bits of compensation data, allowing the target values to vary Increases manufacturing yields, by increasing the probability that the output of every printing element in the array can be successfully adjusted to the target value.

For a given manufacturing yield, the invented method allows the size of the compensation steps to be reduced, thereby reducing output variations between adjacent printing elements and improving the appearance of the print

DETAILED DESCRIPTION OF THE INVENTION

Embodiments of the invention will be described with reference to the attached illustrative drawings, following a more detailed description of the conventional compensation method, in relation to an LED printing head.

Figure 1:
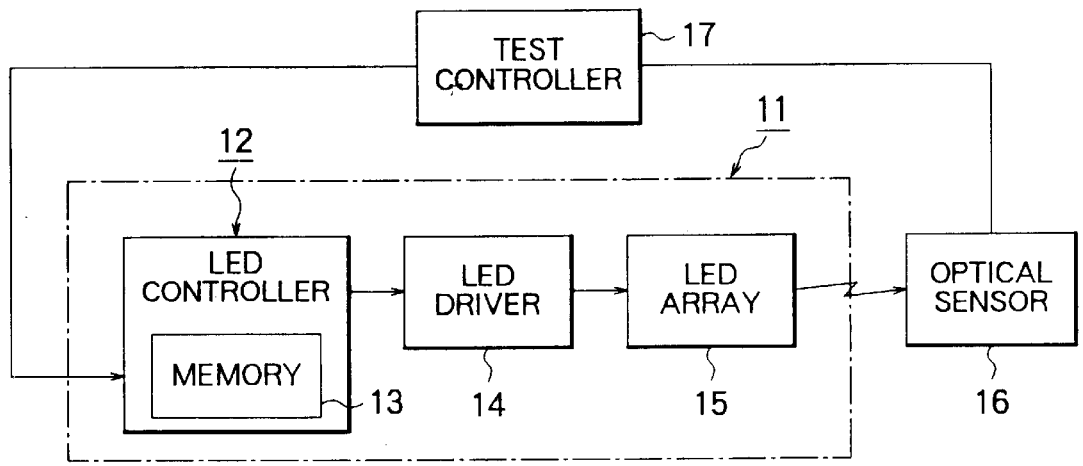
FIG. 1 is a block diagram of an LED printing head and conventional test system.

FIG. 1 shows an LED printing head 11 comprising an LED controller 12 with a non-volatile memory 13, an LED driver 14, and an LED array 15. The LED array 15 is a linear array of LEDs (not visible). The LED array 15 comprises a plurality of LED array chips mounted end-to-end, each chip having a plurality of LEDs.

When manufactured, the LED printing head 11 is tested by a test system comprising an optical sensor 16 and a test controller 17. The optical sensor 16 measures the optical output of each LED. The test controller 17 calculates corresponding compensation data, and writes the compensation data in the non-volatile memory 13 in the LED controller 12.

The test procedure is to drive each LED in turn, store the resulting values measured by the optical sensor 16, calculate the average or mean value of these measured values, and calculate the deviation of each measured value from the mean value. The compensation data have a fixed relationship to the deviations. For example, the compensation data can be obtained by multiplying each deviation by a fixed constant, and rounding the result off the nearest four-bit value. The compensation data written in the non-volatile memory 13 comprise four bits per LED.

Figure 2:
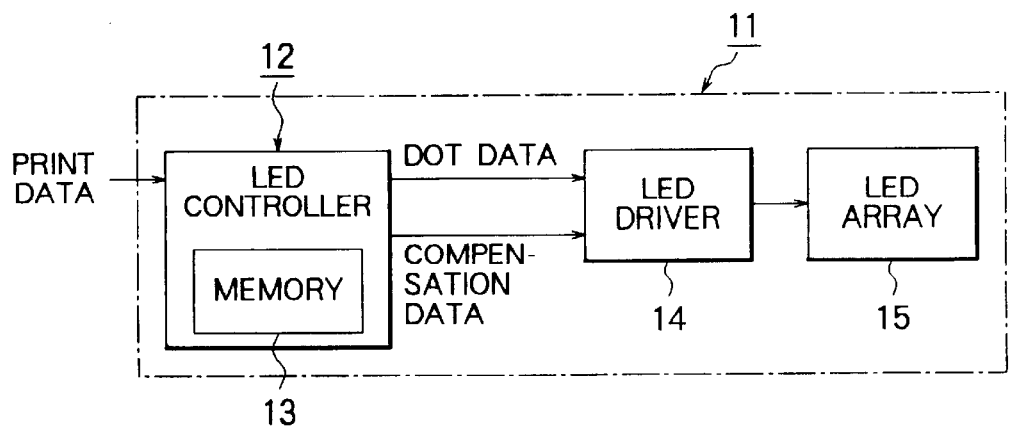
FIG. 2 illustrates the data flow in the LED during printing.

Referring to FIG. 2, during printing, the LED controller 12 receives print data, processes the print data as necessary to obtain dot data for one line of dots, reads the compensation stored in the non-volatile memory 13, and supplies both the dot data and the compensation data to the LED driver 14. The LED driver 14 drives the LED array 15 according to the dot data and compensation data, thereby forming one latent dot line on a photosensitive drum (not visible).

The dot data determine which LEDs are driven. The compensation data determine the energy supplied to each driven LED. The energy can be controlled in various ways. For example, the LED driver 14 can be configured to vary the amount of driving current supplied to each LED according to the compensation data, or to vary the driving time according to the compensation data.

The tolerance for variations in optical output between adjacent LEDs is substantially two percent. The LED driver 14 is accordingly configured so that the least significant bit of compensation data produces a two-percent adjustment in the optical output. The total adjustable range of the optical output is sixteen times two percent ($2^4 \times 2\%$), or thirty-two percent (32%).

Figure 3:
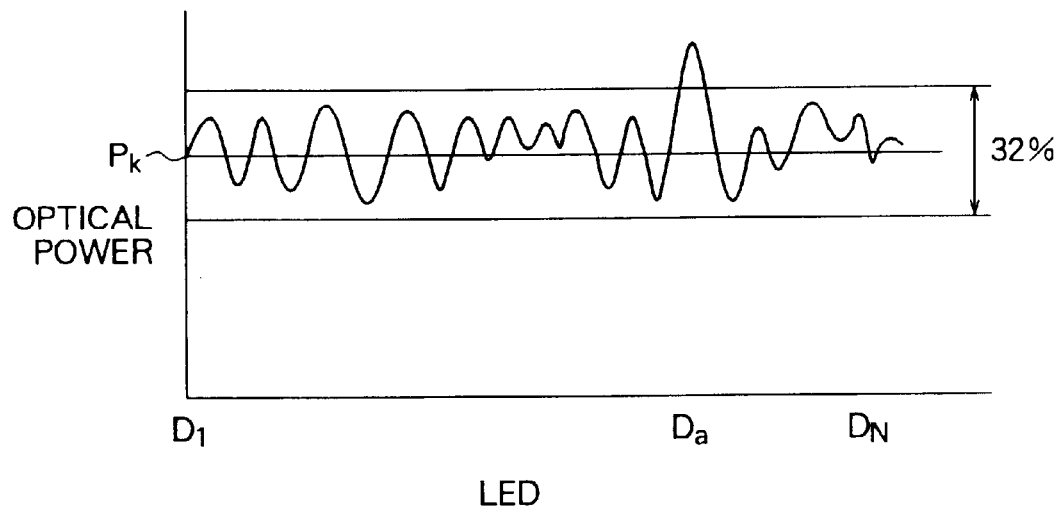
FIG. 3 shows an example of the optical output profile of an LED printing head when driven without compensation.

FIG. 3 is a graph showing an example of the uncompensated optical output profile of a LED printing head having N light-emitting diodes (N is a positive integer, typically greater than one thousand). The light-emitting diodes are denoted $D_1$ to $D_N$ on the horizontal axis. The vertical axis indicates optical power in arbitrary units, $P_k$ being the average optical power when all LEDs are driven. The adjustable range of 32% is centered at $P_k$. The optical output power of the a-th LED ($D_a$) is disposed above the adjustable range.

Figure 4:
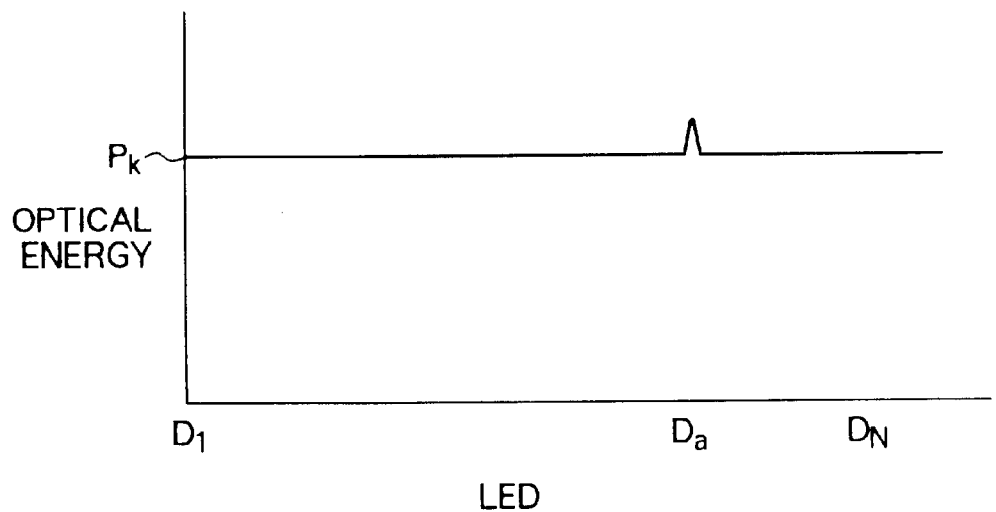
FIG. 4 shows the optical output profile of the same LED printing head when driven with conventional compensation.

FIG. 4 is a similar graph showing the compensated optical output profile of the same printing head. The horizontal axis again indicates LEDs $D_1$ to $D_N$. The vertical axis indicates the optical energy output by each LED when driven according to the compensation data, in arbitrary units, with $P_k$ corresponding to $P_k$ in FIG. 3. Due to the compensation, most of the LEDs output substantially the same amount of optical energy $P_k$. The a-th LED ($D_a$), however, outputs a discernibly greater amount of optical energy, despite use of the maximum compensation value. The abrupt variation at $D_a$ would lead to visible printing defects, so the LED array 15 must be discarded.

Next, a first embodiment of the invention will be described in detail.

Figure 5:
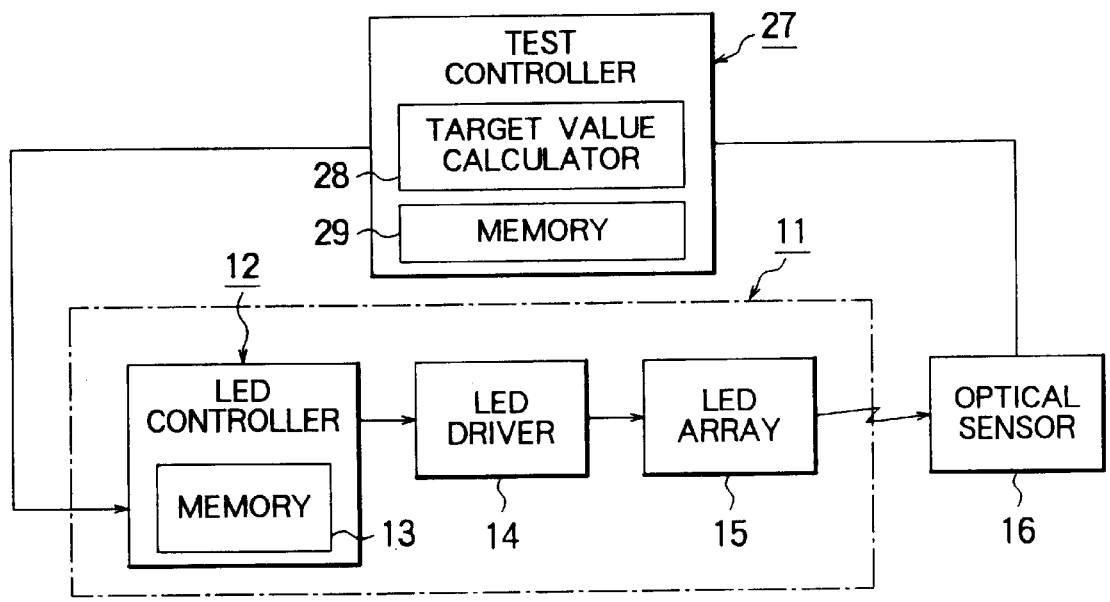
FIG. 5 is a block diagram of an LED printing head and a test system employing the invented compensation method.

Referring to FIG. 5, the LED printing head 11 employed in this embodiment is identical to the LED printing head in FIG. 1, comprising an LED controller 12 with non-volatile memory 13, an LED driver 14, and an LED array 15. The optical sensor 16 in the test system is also the same as in FIG. 1.

The test controller 27 comprises a target value calculator 28 and memory 29. The memory 29 stores optical power values measured by the optical sensor 16. From these values, the target value calculator 28 calculates a target value for each LED. The test controller 27 then determines four-bit compensation data according to the difference between the optical output of each LED and the target value of the LED, and writes the compensation data in the non-volatile memory 13 in the LED controller 12.

The calculation of compensation data in the first embodiment will be described next, with reference to FIGS. 6 and 7. The horizontal and vertical axes in these figures have the same meanings as in FIGS. 3 and 4, respectively.

Figure 6:
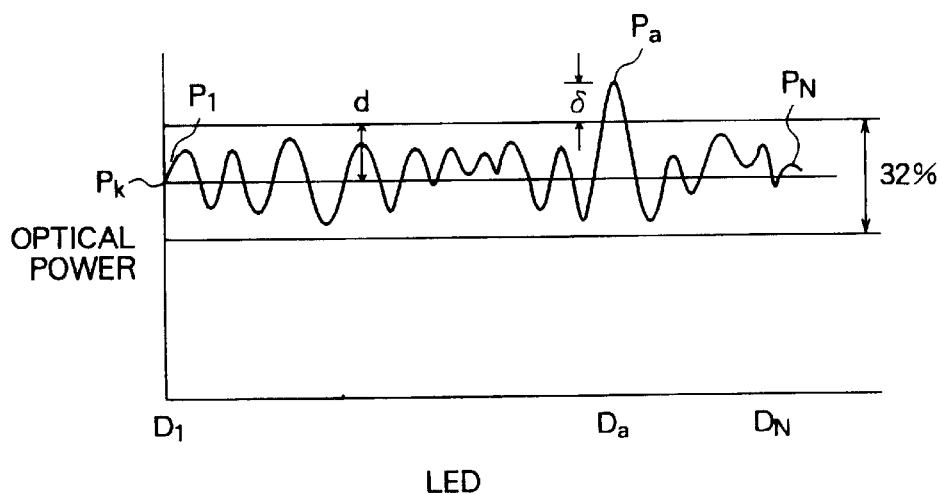
FIG. 6 shows the same example as FIG. 3, with additional notation related to a first embodiment of the invention.

FIG. 6 shows an uncompensated optical output profile of an LED printing head 11 as measured by the optical sensor 16 during the manufacturing process. FIG. 6 is identical to FIG. 3, with the addition of the following explanatory symbols: $P_1$, $P_a$, and $P_N$ denote the measured output values of the three LEDs $D_1$, $D_a$, and $D_N$; $P_t$ denotes a reference value; the letter d denotes the maximum amount by which the output can be adjusted using the four-bit compensation data, in relation to the reference value $P_t$, d being equal to sixteen percent, or half the width of the adjustable range (32%); and the Greek letter δ denotes the amount by which $P_a$ exceeds the adjustable range.

The test controller 27 begins by calculating the reference value $P_t$. In this embodiment, the reference value $P_t$ is the mean value of the measured output power values of the LEDs, equal to $P_k$ in the conventional art.

Next, the test controller 27 decides whether the outputs of all the LEDs fall into the adjustable range from $P_t-d$ to $P_t+d$. If the outputs of all the LEDs are within this range, the test controller 27 stores the same compensation data as in the conventional art. In the present case, however, $P_a$ is outside the adjustable range.

Accordingly, in the next step, the output values $p_{1m}$, $p_{am}$, and $P_{Nm}$ predicted to result from the best possible compensation for $P_1$, $P_a$, and $P_N$ are calculated and stored in the memory 29. In the present case, these values are calculated as follows.

$$p_{1m} = P_t$$

$$P_{am} = P_a - d$$

$$= (P_t + d + \delta) - d$$

$$= P_t + \delta$$

$$P_{Nm} = P_t$$

Using these values, the target value calculator 28 calculates a target value Q(n) for each LED $D_n$ ($1 \leq n \leq N$) by linear interpolation among the values $P_{1m}$, $P_{am}$, and $P_{Nm}$. Across the interval from $D_1$ to $D_a$, the target value Q(n) increases linearly from $P_{1m}$ to $P_{am}$. Across the interval from $D_a$ to $D_N$, the target value Q(n) decreases linearly from $P_{am}$ to $P_{Nm}$. Since $P_{1m}$ and $P_{Nm}$ are both equal to $P_t$, and 1/a is negligibly small, the value of Q(n) is substantially given by the following equations.

$$Q(n) = (P_{am} - P_t)\frac{n}{a} + P_t \qquad (n \leq a)$$

$$Q(n) = (P_{am} - P_t)N - \frac{n}{N-a} + P_t \qquad (n \geq a)$$

To obtain the compensation data, the test controller 27 takes the difference between the optical output $P_n$ and target value Q(n), and uses this difference to calculate a compensation value that will adjust $P_n$ substantially to Q(n). For example, the test controller 27 can multiply the difference $P_n$–Q(n) by a fixed constant and round the result off to four bits.

Figure 7:
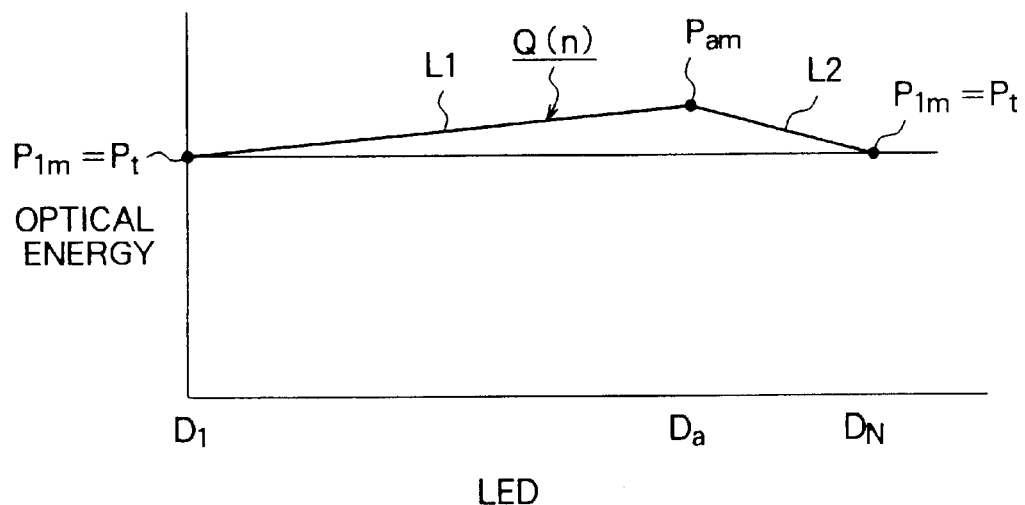
FIG. 7 shows the optical output profile of the LED printing head in FIG. 6 when driven with compensation according to the first embodiment.

If the target values are all attainable, the compensated optical output profile of the LED array 15 will have the shape shown in FIG. 7, the letters P and Q now being used to indicate optical energy. The output optical energy increases gradually along line L1 from $P_{1m}$ (equal to $P_t$) at LED $D_1$ to $P_{am}$ at LED $D_a$, then decreases gradually along line L2 from $P_{am}$ to $P_{Nm}$ (equal to $P_t$) at LED $D_N$. The total range of variation, from $P_t$ to $P_{am}$, is the same as in the conventional art (FIG. 4), but the variation is now gradual, and not readily perceptible in printed output.

An LED printing head 11 with an output profile similar to FIG. 7 can therefore be used in an electrophotographic printer; there is no need to discard the LED array 15. The invented compensation method thus raises the yield of the LED array manufacturing process, and lowers the cost of manufacturing the printer.

Figure 8:
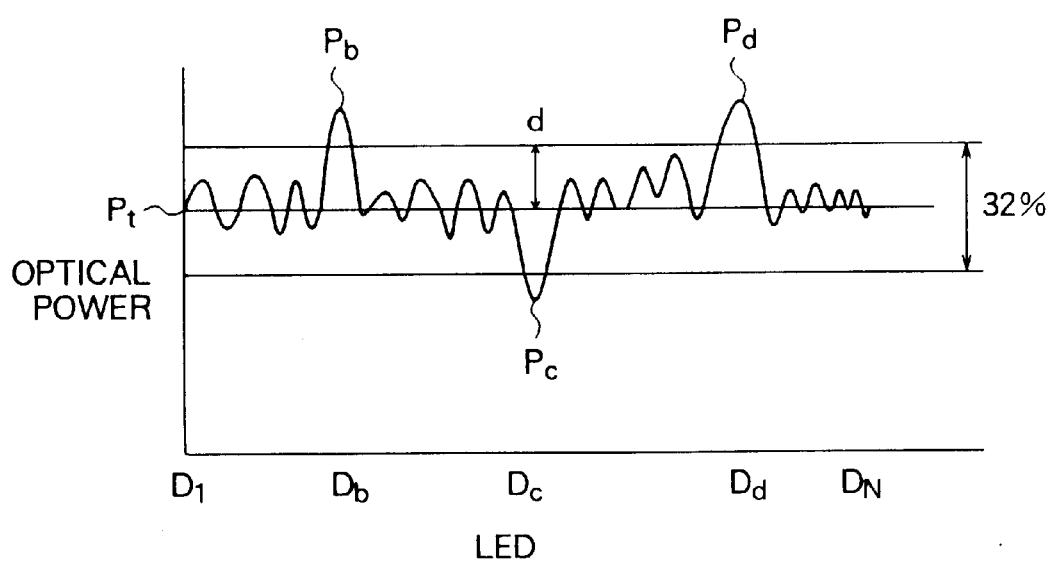
FIG. 8 shows another example of the uncompensated optical output profile of an LED printing head.
Figure 9:
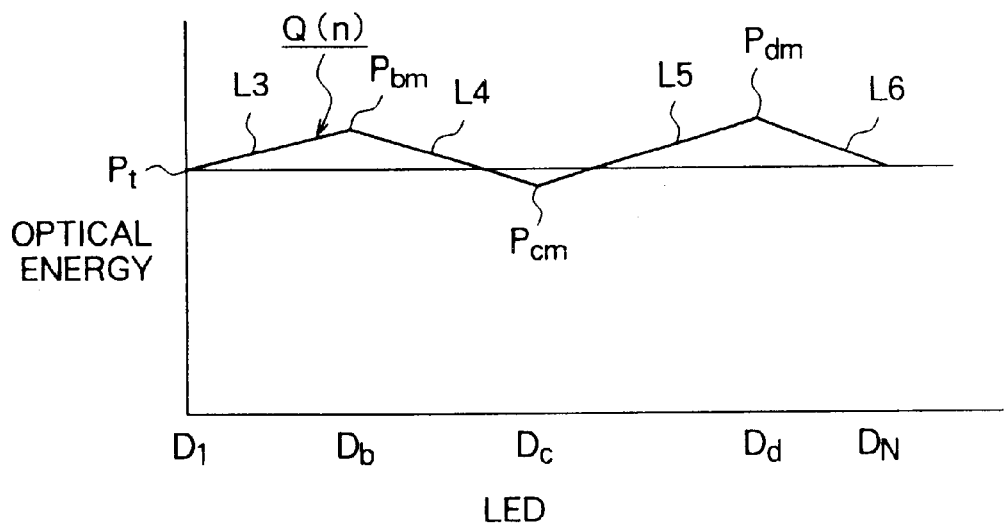
FIG. 9 shows the optical output profile of the LED printing head in FIG. 8 when driven with compensation according to the first embodiment.

Next, a further example will be shown, with reference to FIGS. 8 and 9. The horizontal and vertical axes in these figures again have the same meanings as in FIGS. 3 and 4, respectively.

In this further example, as shown in FIG. 8, three LEDs, $D_b$, and $D_c$, and $D_d$, have optical output values lying outside the adjustable range. As in the preceding example, the adjustable range extends by d above and below the mean LED output value Pt, the total adjustable range being 32%. $P_b$ and $P_d$ are disposed above the adjustable range, while $P_c$ is disposed below the adjustable range. The best compensated values $P_{bm}$, $P_{Cm1}$, and $P_{dm}$ are respectively equal to $P_b$–d, $P_c$+d, and $P_d$–d. These values are stored in the memory 29, together with $P_{1m}$ and $P_{Nm}$, which are both equal to the mean value $P_t$.

In this example, the target value calculator 28 calculates target values Q(n) that vary piecewise linearly, varying linearly from $P_t$ at $D_1$ to $P_{bm}$ at $D_b$, then to $P_{cm}$ at $D_c$, then to $P_{dm}$ at $D_d$, then back to $P_t$ at $D_N$. All of these target values are attainable in the present example, so the compensated optical output profile has the shape shown in FIG. 9, comprising linearly increasing and decreasing segments L3, L4, L5, and L6. Once again the variations are gradual and are not readily noticed in printed output, so the LED array 15 need on be discarded.

Figure 10:
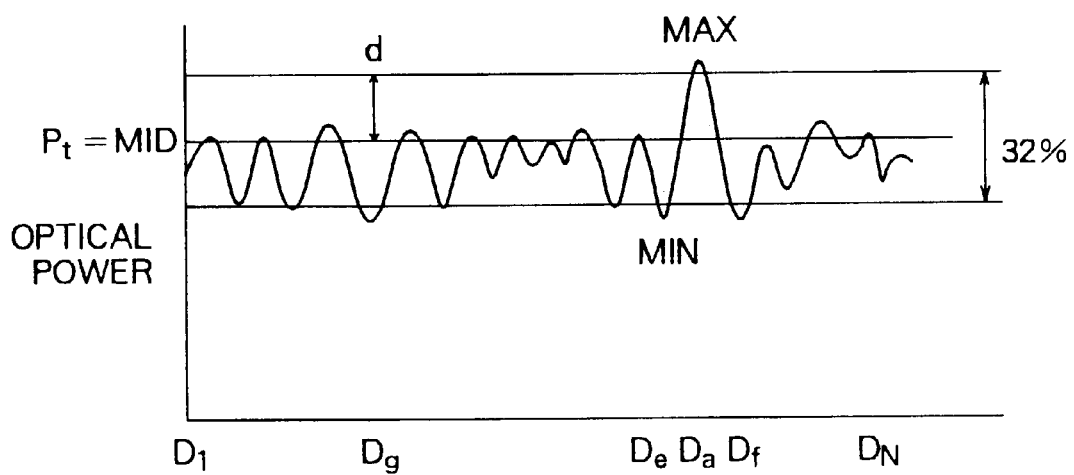
FIG. 10 shows another example of the uncompensated optical output profile of an LED printing head, illustrating a variation of the first embodiment.

In the preceding examples, the reference value $P_t$ was the mean value of the measured output power values of the LEDs, but the first embodiment is not restricted to this method of calculating $P_t$ As a variation, $P_t$ can be set equal to the midpoint between the minimum and maximum measured output power values, as illustrated in FIG. 10.

The profile in FIG. 10 has the same shape as in FIG. 6. MIN, MAX, and MID denote the minimum and maximum values and the midpoint, respectively. The adjustable range has the same width of 32% as in FIG. 6, but is now centered at the midpoint value MID. As a result, four LEDs $D_a$, $D_e$, $D_f$, and Dg have uncompensated optical output values disposed outside the adjustable range, but none of these values is very far outside the adjustable range.

Figure 11:
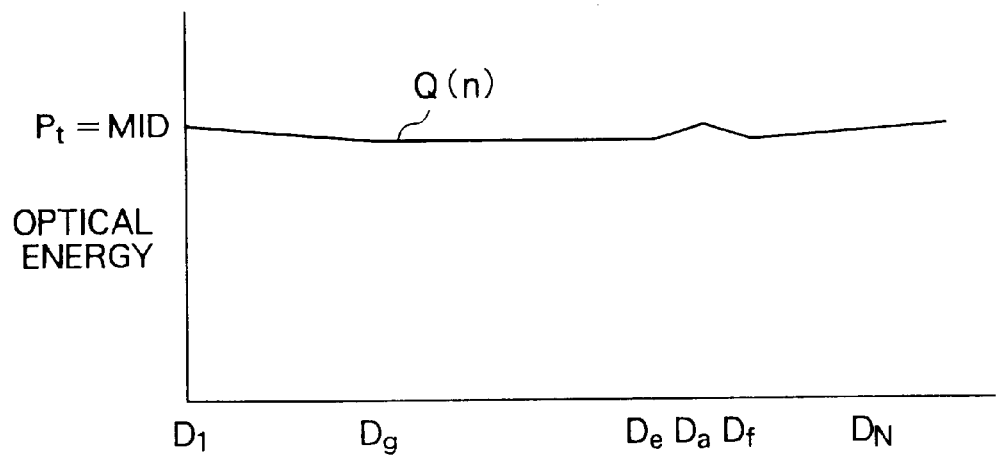
FIG. 11 shows the optical output profile of the LED printing head in FIG. 10 when driven with compensation according to the above variation of the first embodiment.

When target values Q(n) are calculated with $P_t$ set equal to the midpoint value MID, the result is as shown in FIG. 11. All of these target values Q(n) are attainable, so the compensated optical output profile of the LED array 15 will also have the shape in FIG. 11, showing even less variation than in FIG. 7.

Figure 12:
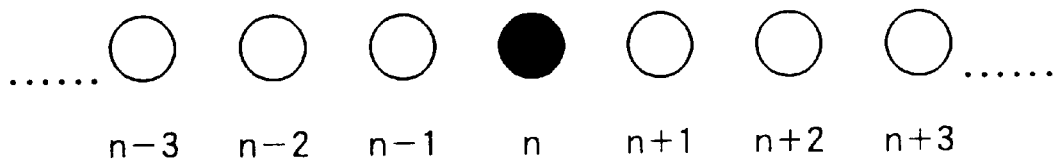
FIG. 12 illustrates the calculation of a moving average in a second embodiment of the invention.
Figure 13:
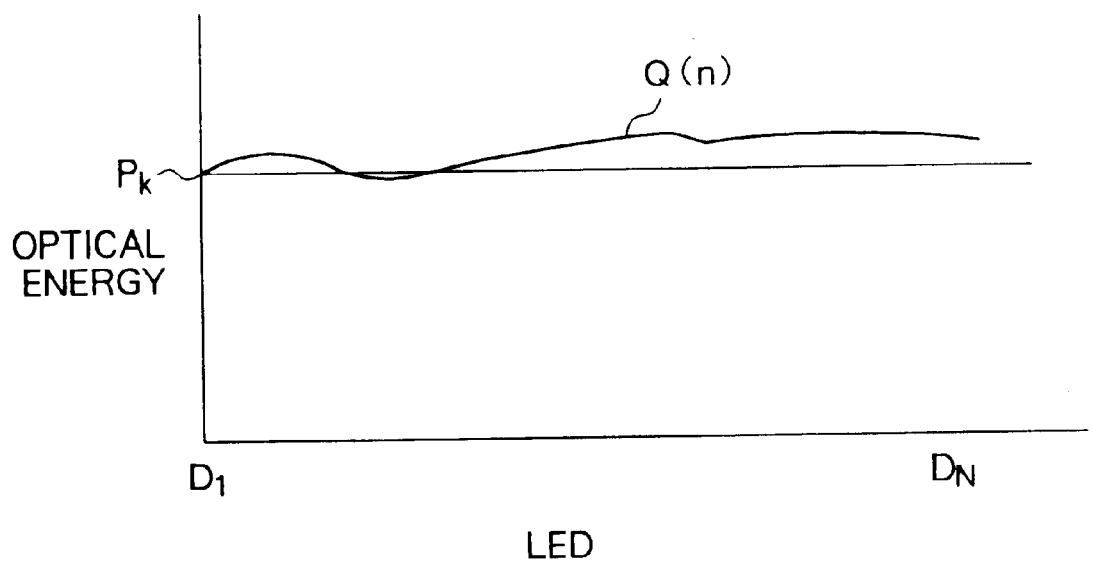
FIG. 13 shows the optical output profile of an LED printing head driven with compensation according to the second embodiment.

Next, a second embodiment of the invention will be described, with reference to FIGS. 12 and 13. The second embodiment is similar to the first embodiment, except for the way in which the target values Q(n) are derived.

In the second embodiment, each target value Q(n) is a runner or moving average of the measured optical output values of a certain number of LEDs, calculated according to the following formula.

$$Q(n) = \left(\sum_{i=n-h}^{n+h} P_i\right) \bigg/ (2h+1)$$

The letter h is a parameter determining the number of LEDs included in the moving average. If h is equal to three, for example, Q(n) is the average of the measured values for seven LEDs from $D_{n-3}$ to $D_{n+}$, illustrated in FIG. 12. In this case, the formula for Q(n) is:

$$Q(n) = \left(\sum_{i=n-3}^{n+3} P_i\right) \bigg/ 7$$

This moving-average calculation causes the test controller 27 to act as a low-pass filter, smoothing out short-term variations in the LED output while preserving long-term trends. The compensated output profile will now have a shape like, for example, the Q(n) curve shown in FIG. 13, drifting up and down from the mean value $P_t$, The variations in this profile tend to be even more gradual than in the first embodiment, and even harder for the eye to detect in printed output.

The parameter h should be roughly equal to the number of LEDs on each LED array chip in the LED array 15, so that chip-to-chip differences in average optical output power can be smoothly absorbed. At the present state of the art, this means that h should be approximately in the range from sixty-four to two hundred fifty-six (64–256). The larger the value of h is, the smoother the target curve Q(n) becomes, but if h is too large, the probability of successful compensation of all LEDs to their target values decreases.

The invented compensation method does not enable all LED arrays 15 to be used; it will still be necessary to discard arrays in which the LEDs cannot all be compensated to their target values. By allowing the target value to vary, however, the present invention significantly increases the probability of successful output compensation for all LEDs in an array, bringing about a corresponding increase in the yield of the LED array manufacturing process.

The higher yield also gives the manufacturer the option of reducing the size of the compensation steps (reducing the value of d in FIGS. 6 and 10), thereby achieving higher overall printing quality by reducing the tolerance for variations between adjacent LEDs.

The target profile Q(n) was calculated as a piecewise linear function in the first embodiment, and by a moving-average method in the second embodiment, but the invention is not limited to these methods. Q(n) can also be calculated by means of Bezier curves, spline interpolation, and other well-known curve approximation methods. Any method that produces target values that vary continuously across the LED array can be employed. 'Vary continuously' means that the variation between mutually adjacent LEDs does not exceed a fixed limit such as, for example, two percent. Variations between LEDs that are not mutually adjacent are not restricted by this limit.

Nor is the usefulness of the invention limited to LED printing heads; the invention can be practiced in other types of printing heads as well, including the thermal printing heads and piezoelectric printing heads employed in facsimile machines and ink-jet printers, in which the printing elements are heating elements or piezoelectric elements. The invention can be practiced in any type of printing head having an array of printing elements, a driving circuit supplying energy to drive the printing elements, and a non-volatile memory storing compensation values that control the amount of energy supplied to individual printing elements in the array. The distinguishing feature of a printing head manufactured according to the invention is that the compensation values cause the outputs of the printing elements to vary continuously in the above sense. Output can be measured as optical power in an optical printing head, as temperature in a thermal printing head, or as ink drop size in a piezoelectric printing head.

The number of bits of compensation data is of course not restricted to four bits per printing element.

Those skilled in the art will recognize that further variations are possible within the scope claimed below.

What is claimed is:

1. A method of compensating for output variations in a printing head having an array of printing elements, comprising the steps of:

measuring an output value of each printing element in said printing head;

calculating, from the measured output values, a plurality of target values, one for each said printing element, such that the calculated target values vary continuously from printing element to successive printing element, along said array of printing elements; and determining printing element drive energy compensation data for each said printing element according to a difference between the output value of said printing element and the target value of said printing element.

2. The method of claim 1, further comprising the step of deciding whether the output value of each said printing element is within a certain adjustable range, said target values being calculated according to output values of the printing elements that are not within said adjustable range.

3. The method of claim 2, further comprising the step of calculating a mean output value of the output values of all of said printing elements, said adjustable range being centered at said mean output value.

4. The method of claim 2, further comprising the step of finding a maximum output value of the output values of all of said printing elements, a minimum output value of the output values of all of said printing elements, and a midpoint value halfway between said maximum output value and said minimum output value, said adjustable range being centered at said midpoint value.

5. The method of claim 2, further comprising the step of calculating best compensated output values for said printing elements that are not within said adjustable range, said target values varying linearly between pairs of values in a set of values including said best compensated output values.

6. The method of claim 1, wherein said target values are calculated by taking a moving average of said output values.

7. The method of claim 1, wherein said printing elements are light-emitting diodes.

8. The method of claim 1, wherein said printing elements are heating elements.

9. The method of claim 1, wherein said printing elements are piezoelectric elements.

10. The method of claim 1, further comprising the steps of:

storing said compensation data in said printing head; and driving each said printing element with an energy corresponding to said compensation data.

11. The method of claim 1, wherein said step of calculating includes calculating target values that vary smoothly, printing element to successive printing element, along the array of printing elements.

12. The method of claim 1, further comprising the step of deciding whether the output value of each printing element is within a certain adjustable range, wherein said step of calculating includes, for printing elements having output values outside of the range, calculating target values that vary monotonically, printing element to successive printing element, in opposite directions from the printing elements having output values outside of the range.

13. The method of claim 1, wherein for said each printing element, the measured output values of a plurality of printing elements adjacent to said printing element, on both sides thereof in said array, are used in calculating the target value of said printing element, so that the output values of the printing elements, when driven according to said printing element drive energy compensation data, vary continuously from printing element to successive printing element, along said array of printing elements.

14. The method of claim 1, wherein for said each printing element, an average of the measured output values of a plurality of printing elements adjacent to said printing element on both sides thereof in said array, are used in calculating the target value of said printing element.

15. A method of compensating for output variation in a printing head having an array of printing elements, comprising the steps of:

measuring an output value of each printing element in said printing head;

calculating a separate target value for each said printing element by taking a moving average of the measured output values; and determining printing element drive energy compensation data in said printing head element according to a difference between the measured output value of said printing element and the target value of said printing element.

16. The method of claim 15, wherein said printing elements are light-emitting diodes.

17. The method of claim 16, wherein said light-emitting diodes are disposed on a plurality of chips, each chip having a certain number of said light-emitting diodes.

18. The method of claim 17, wherein said moving average is an average of the output values of a number of printing elements substantially equal to the number of said light-emitting diodes on each said chip.

19. The method of claim 15, wherein said printing elements are heating elements.

20. The method of claim 15, wherein said printing elements are piezoelectric elements.

21. The method of claim 15, further comprising the steps of:

storing said compensation data in said printing head; and driving each said printing element with an energy corresponding to said compensation data.

22. A printing head having an array of priniiig clements, comprising:

a driving circuit supplying energy to each printing element in said array of printing elements; and a non-volatile memory coupled to said driving circuit, storing printing element drive energy compensation data determining amounts of energy to be supplied to each said printing element so as to cause said printing elements to produce outputs that vary continuously from printing element to successive printing elemnent, along said array of printing elenments, wherein the output produced by each said printing element is substantially equal to a target value of each said printing element that varies continuously along the array and is calculated based on measured uncompensated output values of said printing elements.

23. The printing head of claim 22, wherein the amounts of energy determined by said compensation data prevent, when supplied to the printing elements, variations between the outputs of mutually adjacent printing elements from exceeding a fixed limit, wherein variations between the outputs of printing elements that are not mutually adjacent are not restricted by said fixed limit.

24. The printing head of claim 22, wherein said printing elements are light-emitting diodes.

25. The printing head of claim 22, wherein said printing elements are heating elements.

26. The printing head of claim 22, wherein said printing elements are piezoelectric elements.

27. The printing head of claim 22, wherein the stored compensation data cause the printing elements to produce outputs that vary smoothly, printing element to successive printing element, along the array of printing elements.

28. The printing head of claim 22, wherein the stored compensation data cause the printing elements to produce outputs that vary monotonically, printing element to successive printing element, between at least two pairs of the printing elements.

29. A printing head having an array of printing elements, comprising:

a driving circuit supplying energy to each printing element in said array of printing elements; and a non-volatile memory coupled to said driving circuit, storing printing element drive energy compensation data determining amounts of energy to be supplied to each said printing element so as to cause said printing elements to produce outputs that vary along said array of printing element, wherein the output produced by each said printing element is substantially equal to a moving average of outputs produced by said printing elements under test conditions in which all said printing elements are driven uniformly.

30. The printing head of claim 29, wherein said printing elements are light-emitting diodes.

31. The printing head of claim 30, wherein said array of printing elements comprises a plurality of chips, each chip having a certain number of said light-emitting diodes.

32. The method of claim 31, wherein said moving average is an average of the outputs of a number of printing elements substantially equal to the number of said light-emitting diodes on each said chip.

33. The printing head of claim 29, wherein said printing elements are heating elements.

34. The printing head of claim 29, wherein said printing elements are piezoelectric elements.

35. A method of compensating for output variations in a printing head having an array of printing elements, comprising the steps of:

measuring an output value of each printing element in said printing head;

calculating, from the measured output values, a plurality of target values, one for each said printing element, such that the calculated target vary smoothly from printing element to successive printing element, along said array of printing elements; and determining printing element drive energy compensation data for each said printing element according to a difference between the output value of said printing element and the target value of said printing element.

36. A printing head having an array of printing elements, comprising a driving circuit supplying energy to each printing element in said array of printing elements; and a non-volatile memory coupled to said driving circuit, storing printing element drive energy compensation data determining amounts of energy to be supplied to each said printing element so as to cause said printing elements to produce outputs that vary smoothly from printing element to successive printing element, along said array of printing elements, wherein the output produced by each said printing element is subitantially equal to a target value of each said printing element that varies smoothly along the array and is calculated based on measured uncompensated output values of said printing elements.

* * * * *